United States Patent [19]
Rooker

[11] Patent Number: 6,065,485
[45] Date of Patent: May 23, 2000

[54] TWO-WAY PRESSURE RELIEF ASSEMBLY AND METHOD

[75] Inventor: Mitchel Lawrence Rooker, Sand Springs, Okla.

[73] Assignee: BS&B Safety Systems, Inc., Tulsa, Okla.

[21] Appl. No.: 08/834,096

[22] Filed: Apr. 14, 1997

[51] Int. Cl.$^7$ .................................................. F16K 17/40
[52] U.S. Cl. ...................................... 137/68.26; 137/68.24; 220/89.1
[58] Field of Search .............................. 137/68.19, 68.24, 137/68.25, 68.26; 220/89.1, 89.2

[56] References Cited

U.S. PATENT DOCUMENTS

| | | | |
|---|---|---|---|
| 3,834,581 | 9/1974 | Solter et al. | 137/68.26 X |
| 3,901,259 | 8/1975 | Banbury | 137/68.26 X |
| 4,085,764 | 4/1978 | Raidl, Jr. | 137/68.26 X |
| 4,257,528 | 3/1981 | Brodie | 137/68.26 X |
| 4,399,830 | 8/1983 | Brodie | 137/68.26 X |
| 4,580,691 | 4/1986 | Hansen | 137/68.26 X |
| 4,657,157 | 4/1987 | Short, III | 137/68.26 X |
| 4,795,051 | 1/1989 | Ou | 137/68.26 X |
| 4,905,722 | 3/1990 | Rooker et al. | 137/68.26 X |
| 5,368,180 | 11/1994 | Farwell et al. | 220/89.2 |

*Primary Examiner*—John Rivell
*Attorney, Agent, or Firm*—Lawrence R. Watson, Esq.; Gardere & Wynne, L.L.P.

[57] ABSTRACT

A two-way pressure relief assembly includes a disk having a peripheral flange for clamping the disk between inlet and outlet clamps in a passageway. The inlet side of the disk has a selected inlet relief pressure which will cause the flange and disk to pull out from between the inlet and outlet clamps and move toward the outlet side. The outlet side of the disk has an outlet relief pressure which will cause the flange and disk to pull out from between the inlet and outlet clamps and move toward the inlet side. A pressure support may be clamped between the disk flange and the inlet clamp for increasing the outlet relief pressure to a selected magnitude. The open center of the pressure support may be enlarged to decrease the outlet relief pressure or reduced to increase the outlet relief pressure. Support members may be extended across the central portion of the pressure support for increasing the outlet relief pressure. Inlet and outlet gaskets may be provided on the corresponding sides of the disk. The structure and properties of the gaskets may be selected to adjust the inlet and outlet relief pressures.

76 Claims, 6 Drawing Sheets

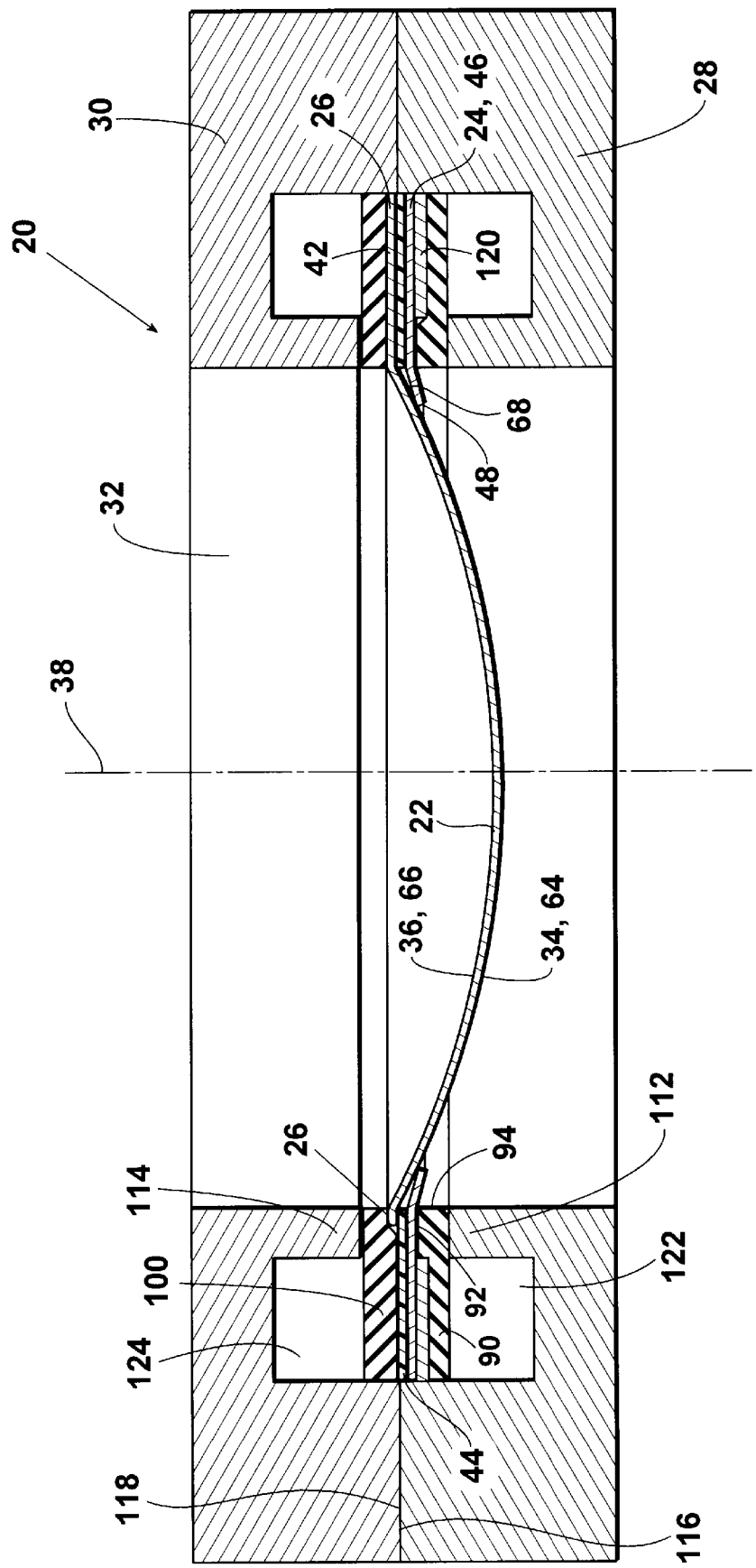

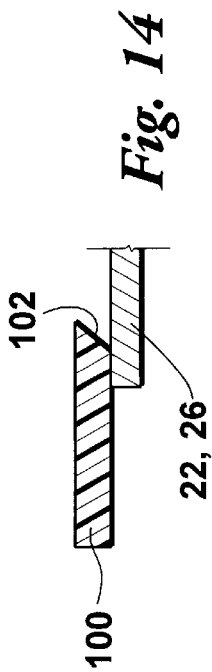
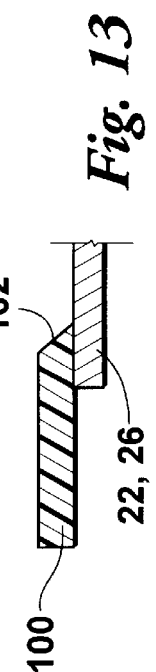
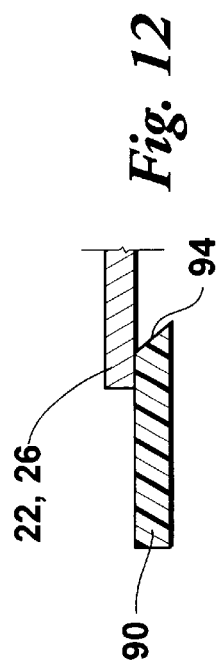
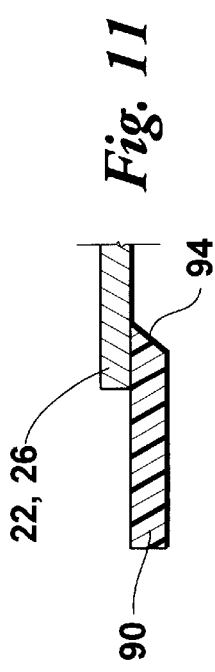
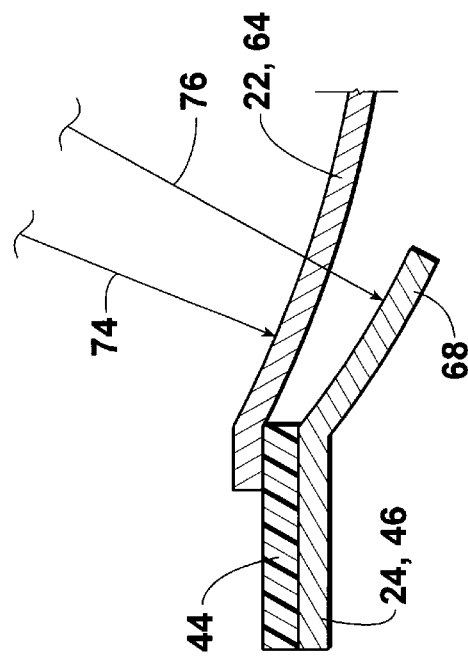
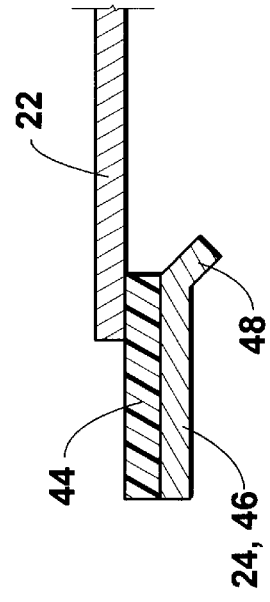
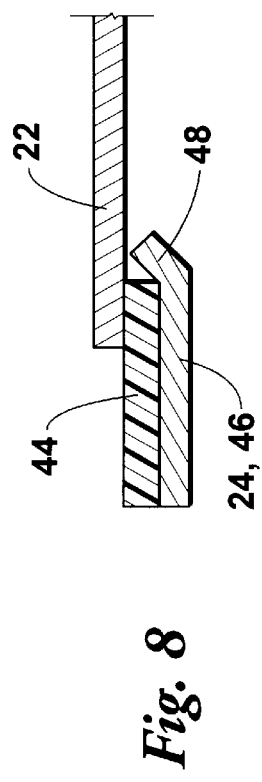

TWO-WAY PRESSURE RELIEF ASSEMBLY AND METHOD

BACKGROUND OF THE INVENTION

This invention relates to pressure relieving rupture disk assemblies, and more particularly, to an improved two-way pressure relieving assembly which will accurately operate at low pressures.

The use of various types of rupture disks to prevent overpressure in a fluid pressure containment structure are known. Generally, such devices have included a rupture disk supported between a pair of support members or flanges which are in turn connected to a relief passageway in a vessel or system containing fluids under pressure. When the fluid pressure within the vessel or system exceeds the predetermined rupture pressure of the disk, rupture occurs, causing pressurized fluid to be relieved from the vessel or system.

Rupture disks of the reverse buckling type have been developed and used successfully. Reverse buckling rupture disks generally include a dome-shaped portion and the fluid pressure from the vessel or system being protected is exerted on the convex side of the dome. Upon failure, the dome-shaped portion reverses and then ruptures. Originally, most reverse buckling rupture disks assemblies included knife blades positioned adjacent to the rupture disks on the concave side of the disks. On reversal, the disks impaled on the knife blades causing them to open in a predetermined manner. More recently, reverse buckling disks have included scores or lines of weakness on a surface of the disk so that upon reversal the disks tear along the scores or lines of weakness.

While scored reverse buckling rupture disks have been used successfully and have eliminated the need for knife blades in high pressure applications, scored reverse buckling rupture disks have only achieved varying degrees of success in low pressure applications. Consequently, knife blades have had to be utilized with reverse buckling rupture disks utilized in low pressure applications. The inclusion of the knife blades causes the rupture disk assemblies to be relatively expensive. Further, the reverse buckling rupture disks using scores and/or knives have a satisfactory rupture pressure predictability in the reverse buckling direction, but their ability to provide sufficiently predictable rupture pressures in both directions has not been satisfactory.

U.S. Pat. No. 5,368,180 issued Nov. 29, 1994 to Farwell et al., assigned to the assignee of this application, and incorporated herein by reference, discloses a perforated rupture disk assembly designed to eliminate the need for knife blades and to provide pressure relief at relatively low relief pressures. Although, as indicated in the Farwell patent, the perforated rupture disk assembly will allow pressure relief in both directions, the accuracy and predictability of the rupture pressure from the concave side of the disk is less than desirable. Farwell does not disclose or suggest apparatus or method for selectively adjusting the rupture pressure of a rupture disk other than through the use of perforations in the rupture disk.

U.S. Pat. No. 3,901,259 issued Aug. 26, 1975 to Banbury discloses a safety pressure relief apparatus having a reverse buckling pressure relief disk secured by its edge region between two support members solely by virtue of the axial pressure exerted on the disk by the support members. The area of the edge region of the disk is such that when the disk is reversed upon build up of pressure within a vessel, the reverse buckling disk reverse buckles and the edge region is released from between the two support members by radially inward movement of the disk. Banbury discloses varying the width of the edge of the disk being gripped and the axial pressure thereon to control the reverse buckling rupture pressure. Banbury does not disclose or suggest using the pressure relief apparatus to relieve pressure in the non-reverse buckling direction, or any structure for accurately predetermining or adjusting the relief pressure in the non reverse buckling direction.

There is a need for a two-way pressure relief assembly which will relieve overpressures accurately and predictably at a wide range of pressures, including low relieving pressures; which will operate accurately and predictably at low pressure relieving ratios (the ratio of the inlet relieving pressure to the outlet relieving pressure); which may be used with reverse buckling and non-reverse buckling (tension) disks; which provides structure and method other than the disk, for accurately adjusting the magnitude of the relief pressure in both directions; and which provides structure and method for adjusting the ratio of the two relief pressures in the two-way pressure relief assembly.

SUMMARY OF THE INVENTION

The present invention is contemplated to overcome the foregoing deficiencies and meet the above described needs. In accomplishing this, the present invention provides a novel and improved two-way pressure relief assembly.

The two-way pressure relief assembly may be sealingly clamped between inlet and outlet clamps in a pressure containment passageway and includes a disk having a peripheral flange extending from the disk for clamping the disk between the inlet and outlet clamps. The disk has an inlet side, and outlet side, and a central axis extending through the inlet and outlet sides. The inlet side of the disk has a selected inlet relief pressure which, when exerted on the inlet side, will cause the flange and disk to pull out of the inlet and outlet clamps and move toward the outlet side, thereby allowing pressure relief through the assembly. The outlet side of the disk has an outlet relief pressure which, when exerted on the outlet side, will cause the flange and disk to pull out of the inlet and outlet clamps and move toward the inlet side, thereby allowing pressure relief through the assembly. A pressure support may be disposed on the inlet side of the disk between the peripheral flange of the disk and the inlet clamp for increasing the outlet relief pressure to a selected magnitude.

It is an advantage of the present invention to provide a two-way pressure relief assembly which will operate accurately and predictably at low relieving pressures.

It is an advantage of the present invention to provide a two-way pressure relief assembly which will operate accurately and predictably at low pressure relief ratios.

It is an advantage of the present invention to provide a two-way pressure relief assembly which will operate accurately and predictably, without premature failure, when exposed to a large number of rising and falling pressure cycles.

BRIEF DESCRIPTION OF THE DRAWINGS

The present invention will be better understood by reference to the examples of the following drawings:

FIG. 3 is a cross-sectional, elevational view of another assembled embodiment of the two-way pressure relief assembly of the present invention.

FIG. 8 is a fragmentary, cross-sectional view of an embodiment of the invention.

FIG. 9 is a fragmentary, cross-sectional view of another embodiment of the invention.

FIG. 10 is a fragmentary, cross-sectional view of another embodiment of the invention.

FIG. 11 is a fragmentary, cross-sectional view of another embodiment of the invention.

FIG. 12 is a fragmentary, cross-sectional view of another embodiment of the invention.

FIG. 13 is a fragmentary, cross-sectional view of another embodiment of the invention.

FIG. 14 is a fragmentary, cross-sectional view of another embodiment of the invention.

DETAILED DESCRIPTION OF THE PREFERRED EMBODIMENTS

Figure 1:
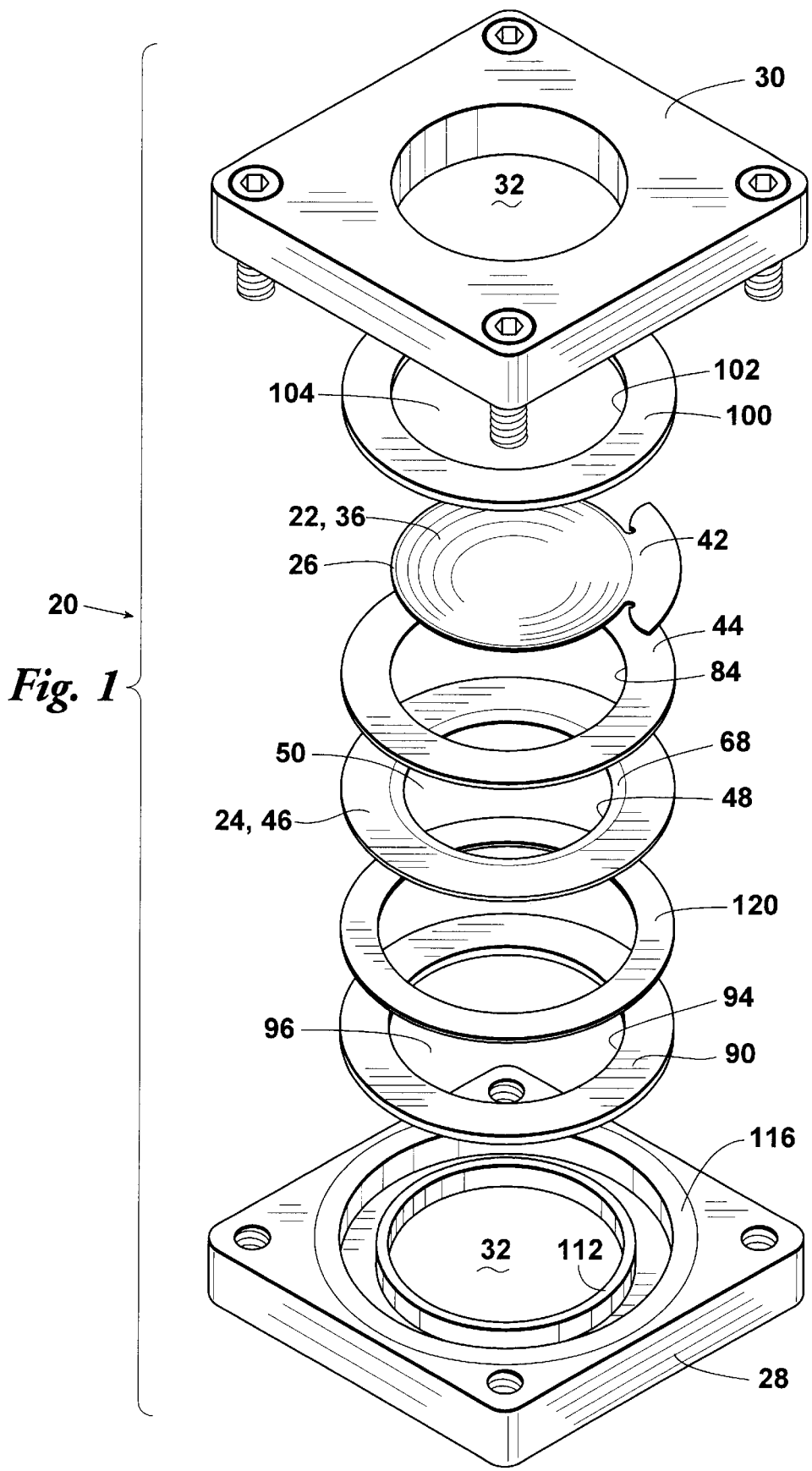
FIG. 1 is an exploded, perspective view of an embodiment of the two-way pressure relief assembly of the present invention.

Preferred embodiments of the invention will now be described with reference to the drawings. Like reference numerals or characters refer to like or corresponding parts throughout the drawings and description.

FIGS. 1–14 present embodiments of the two-way pressure relief assembly 20 and method of the present invention. Although the invention is described herein as being used in relatively low pressure application, it is intended to be understood that the invention may be used in a wide range of pressure magnitudes. Referring to the example of FIG. 1, in a preferred embodiment, the pressure relief assembly 20 may be generally described as including a disk 22 and a pressure support 24. Although the disk 22 is depicted and described herein as having a generally round outside perimeter, it is intended to be understood that the disk 22, as well as the structure and passageway in which it is sealingly contained, may have virtually any peripheral shape, e.g., square, rectangular, triangular, octagonal, etc. As would be understood by one skilled in the art in view of the disclosure herein, there are a number of known factors which will influence the relief pressures in the assembly 20, such as the surface friction between the components; the axial pressure or compression exerted on the disk 22, pressure support 24, and gaskets; the crown height and thickness of the disk 22; and the like. For purposes of this application it is assumed such known factors are of constant value. The inventive assembly 20 provides structure and method for improving the accuracy, predictability, and adjustability of the relief pressures over the known factors.

The disk 22 has a peripheral flange 26 extending radially outwardly from the disk 22 for clamping the disk 22 between an inlet clamp 28 and an outlet clamp 30 in a passageway 32. When so clamped, the disk 22 seals the passageway 32 and sealingly contains pressure exerted on either side of the disk.

Figure 15:
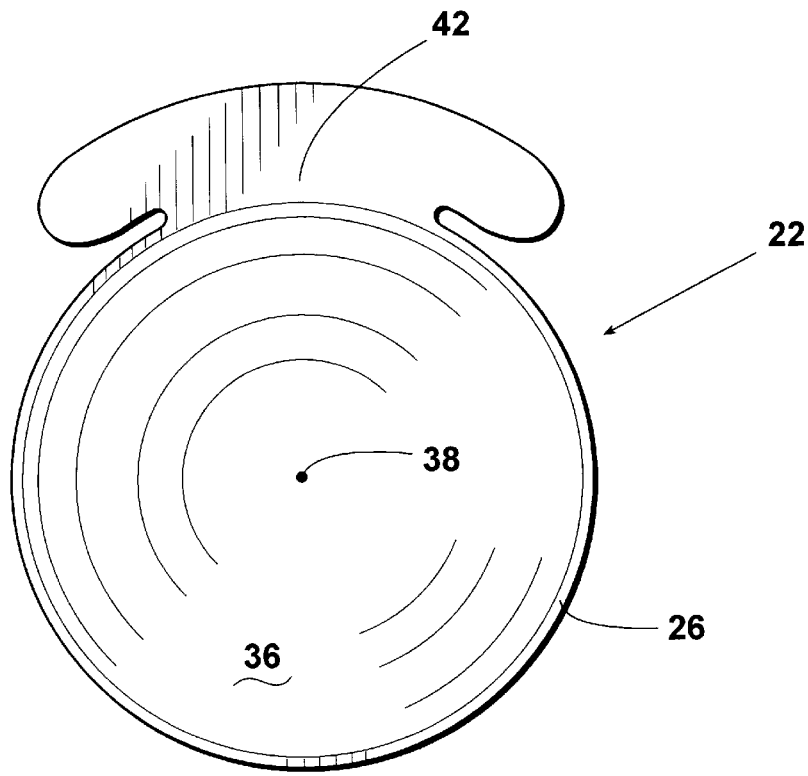
FIG. 15 is a top plan view of an embodiment of the disk of the present invention.
Figure 16:
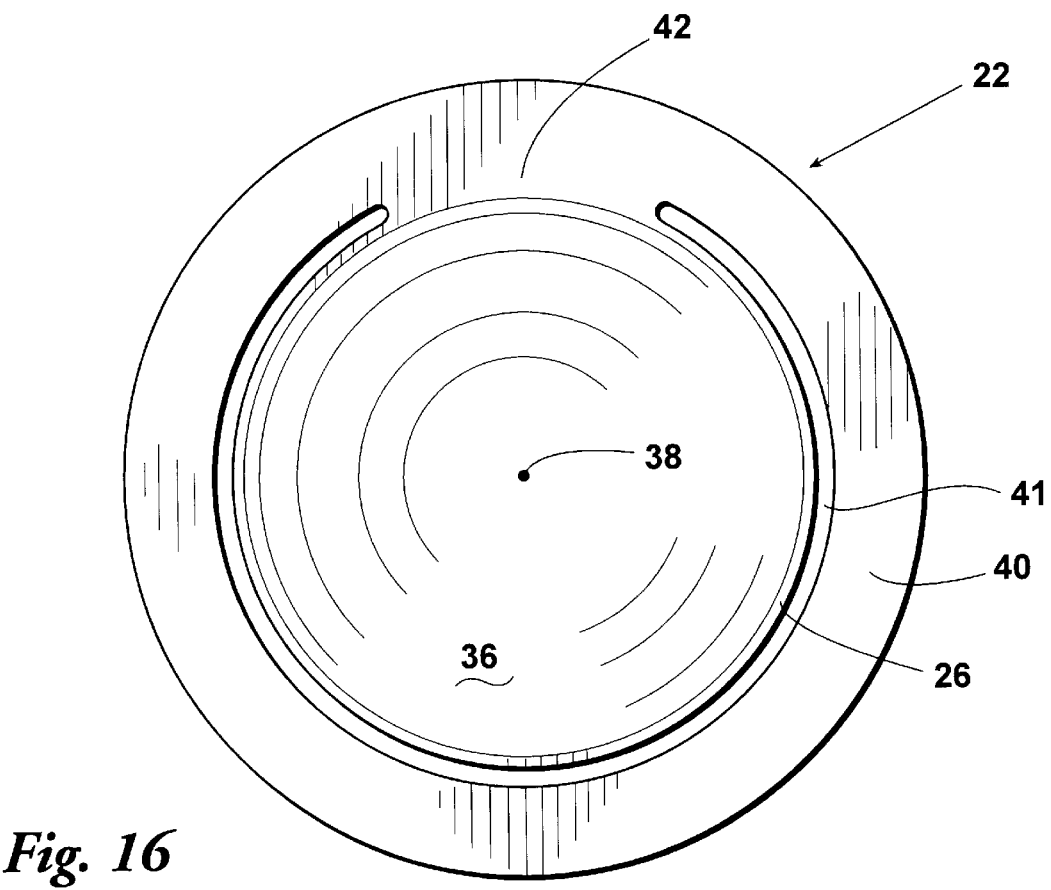
FIG. 16 is a top plan view of another embodiment of the disk of the present invention.

The disk 22 has an inlet side 34, outlet side 36, and a central axis 38 extending through the inlet and outlet sides 34, 36 of the disk 22. The inlet side 34 of the disk 22 has a selected, predetermined inlet relief pressure (more accurately described as the differential pressure between the inlet side 34 and outlet side 36 of the disk 22) which, when exerted on the inlet side 34 will cause the flange 26 and disk 22 to pull from between the inlet and outlet clamps 28, 30 and move toward the outlet clamp 28 thereby allowing pressure relief through the assembly 20. The outlet side 36 of the disk 22 has predetermined outlet relief pressure (more accurately described as the differential pressure between the outlet side 36 and inlet side 34 of the disk 22) which, when exerted on the outlet side 36 will cause the flange 26 and disk 22 to pull from between inlet and outlet clamps 28, 30 and move toward the inlet clamp 28, thereby allowing pressure relief through the assembly 20. As best seen in FIGS. 15 and 16, in the preferred assembly 20, the disk flange 26 includes a hinge means or hinge portion 42 for securing the disk between the inlet and outlet clamps 28, 30 during and after pressure relief from either side 34, 36 of the disk in order to retain the disk 22 within the assembly 20. The preferred hinge portion 42 is a radially outward extension of the disk flange 26 which extends sufficiently into the inlet and outlet clamps 28, 30 that the hinge portion 42 will not pull out of the clamps 28, 30 with the remainder of the flange 26 when the inlet or outlet relief pressure is exceeded.

As exemplified in FIG. 16, in order to facilitate assembling the assembly 20 and reduce the likelihood of damaging the disk 22, the disk 22 may include a support flange 40 circumscribing the disk peripheral flange 26 and separated from the flange 26 by an arcuate slot 41 which is cut through the disk 22. The slot 41 is sized so that the support flange 40 does not affect the inlet and outlet relief pressures of the disk 22.

Referring to the example of FIG. 1, the pressure support 24 is disposed on the inlet side 34 of the disk 22 between the peripheral flange 26 and the inlet clamp 28 for increasing the outlet relief pressure to a selected, predetermined magnitude. The preferred pressure support 24 includes a peripheral flange 46, disposed for clamping between the inlet side 34 of the peripheral flange 26 of the disk 22 and the inlet clamp 28; and an inside edge 48 defining a central portion 50. As exemplified in FIGS. 1 and 4, in one embodiment, the central portion 50 of the pressure support 24 is open and provides no direct support to the inlet side 34 of the disk 22, the disk 22 being supported by the peripheral flange 46 of the pressure support 24.

Figure 2:
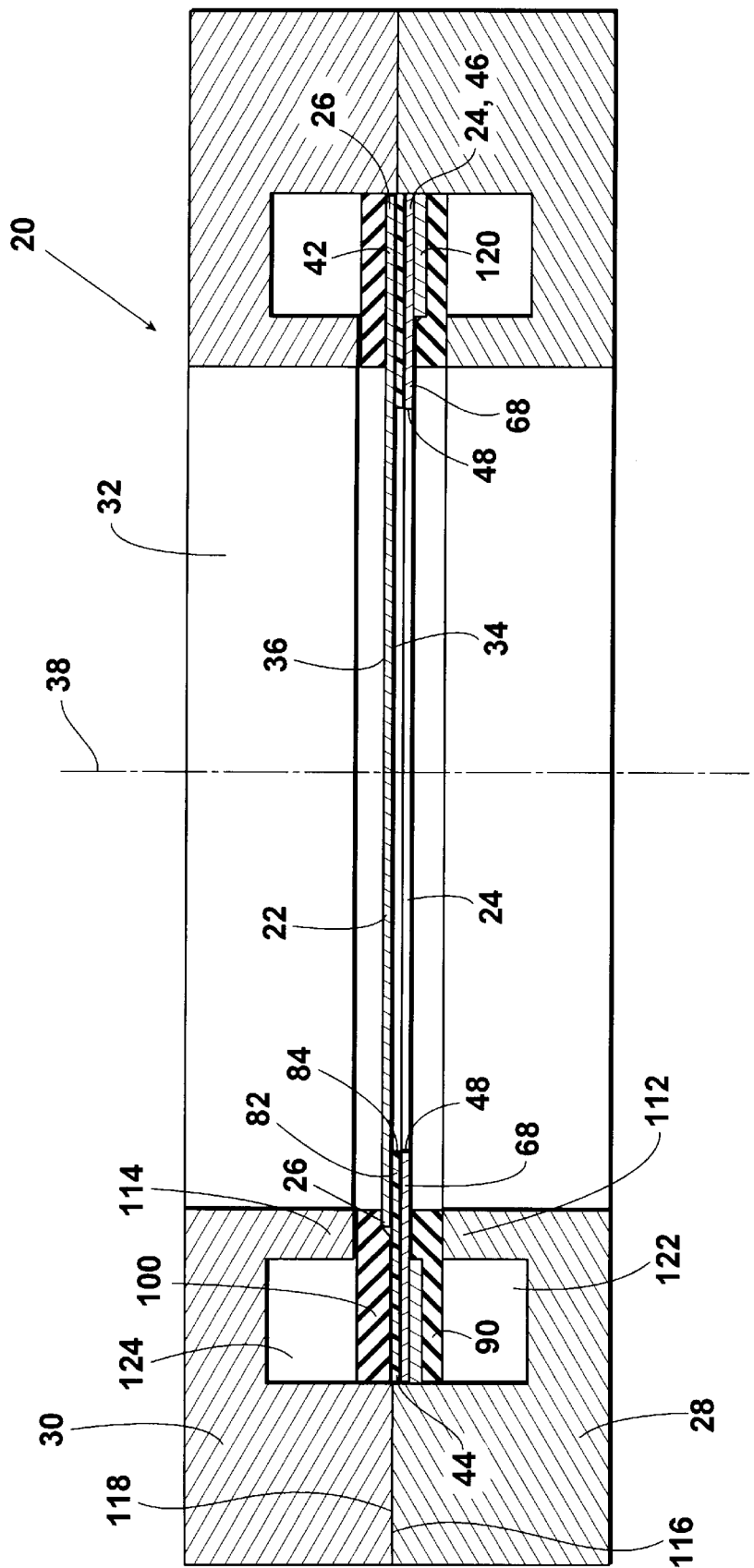
FIG. 2 is a cross-sectional, elevational view of an assembled embodiment of the two-way pressure relief assembly of the present invention.
Figure 5:
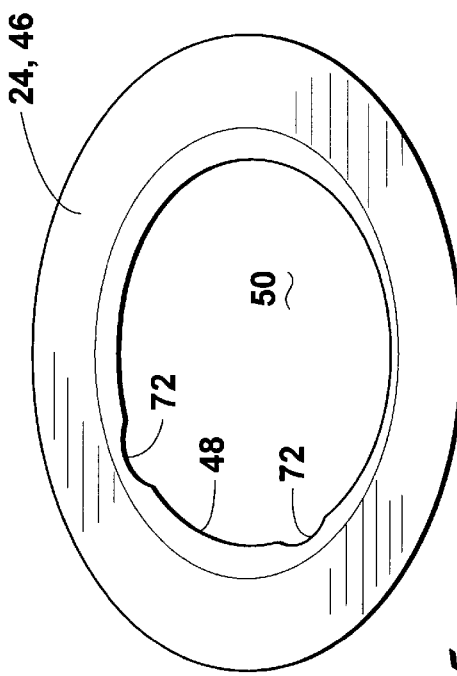
FIG. 5 is a perspective view of another embodiment of a pressure support which may be used in the assembly of FIG. 1.

Referring to the example of FIGS. 2, 3, and 5, the inside edge 48 of the pressure support 24 may be selectively extended towards the central axis 38 relative to the disk flange 26 in order to reduce the size of the open central portion 50 and to increase the outlet relief pressure to a selected magnitude. Conversely, the inside edge 48 of the pressure support 24 may be selectively extended away from the central axis 38 relative to the disk flange 26 in order to increase the size of the open central portion 50 and to decrease the outlet relief pressure to a selected magnitude. The inside edge 48 of the pressure support 24 should at least slightly overlap the inlet side 34 of the disk flange 26. Intermediate gasket 44 may be provided to improve the sealing properties of the contact between the pressure support 24 and the disk 22.

Figure 6:
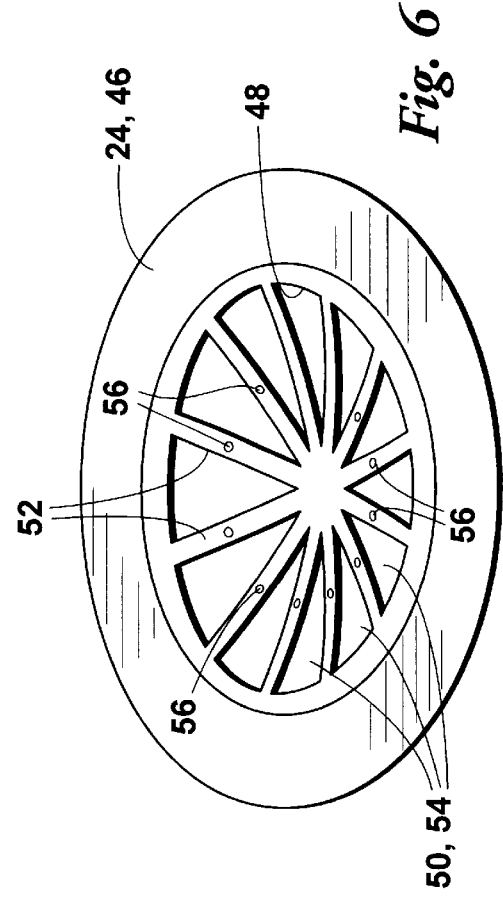
FIG. 6 is a perspective view of yet another embodiment of a pressure support which may be used in the assembly of FIG. 1.

Referring to the example of FIG. 6 in another embodiment, the pressure support 24 includes at least one support member 52 extending across the central portion 50 of the pressure support 24 for supporting the inlet side 34 of the disk 22 against pressure from the outlet side 36 of the disk 22. As exemplified in FIG. 6, multiple support members 52 may be used and arranged as needed to provide the required support. The hub and spoke arrangement of FIG. 6 is intended as an example of a typical arrangement, as would be known to one skilled in the art in view of the disclosure contained herein.

Figure 7:
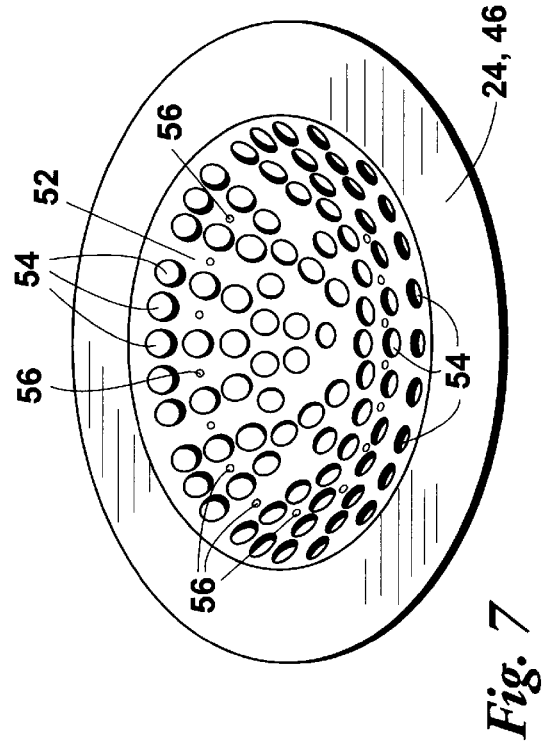
FIG. 7 is a perspective view of yet another embodiment of a pressure support which may be used in the assembly of FIG. 1.
Figure 4:
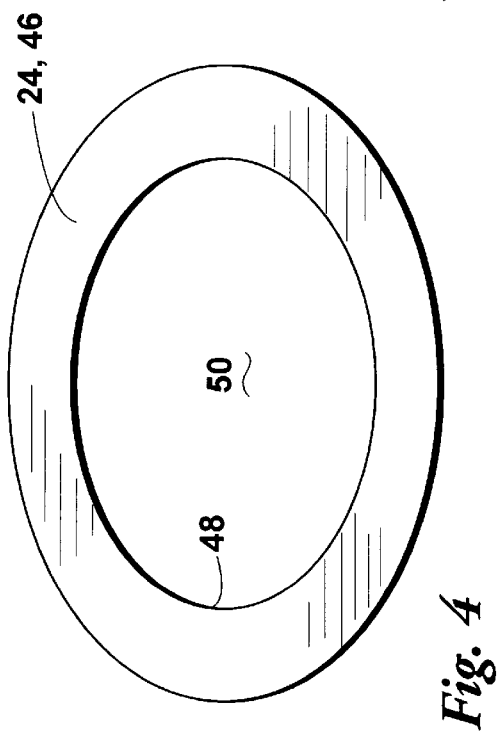
FIG. 4 is a perspective view of the pressure support used in the assembly of FIG. 1.

Referring to the example of FIG. 7, in another embodiment, the support member 52 extends across or covers the entire central portion 50 with at least two openings 54 in the support member 52. The number and size of the openings 54 may be varied to adjust the strength and flow characteristics of the pressure support 24, as would be known to one skilled in the art in view of the disclosure contained herein. Referring to the examples of FIGS. 6 and 7, the more preferred support member 52 includes at least one weaker area 56 of selected pressure supporting weakness with respect to the remainder of the support member 52. The weakness of the weaker area 56 is selected to determine the outlet relief pressure. The weaker area 56 may be formed by removing material from the support member, perforating the support member, providing score lines to weaken the support member and other methods which would be known to one skilled in the art in view of the disclosure contained herein. The weaker areas 56 may be arranged to predetermine the portion and shape of the pressure support 24 which will open during an overpressure or pressure relieving event. The weaker areas 56 may be omitted from the area of the pressure support 24 aligned with the hinge portion 42 of the disk 22 so that the pressure support 24 will be retained within the assembly 20 after a pressure relieving event.

Referring to the example of FIG. 2, the disk 22 and disk flange 26 may be generally planar in the radial or diametrical dimension, with the structure and features of the pressure support 24, central portion 50, and support members 52 conforming to the planar shape, as would be known to one skilled in the art in view of the disclosure contained herein. In the more preferred embodiment, referring to the example of FIG. 3, the inlet side 34 of the disk 22 includes a protuberance 64 extending from the central portion 50 of the disk towards the inlet clamp 28 and the outlet side 36 of the disk 22 includes a recess 66 of substantially the same shape and size as the protuberance 64. Preferably, the protuberance 64 and recess 66 are formed at the same time in the material of which the disk 22 is made and the recess 66 has substantially the same radius of curvature as the protuberance 64. The protuberance 64 may take virtually any protuberant shape, such as a cone, frustocone, frustum, pyramid, or the like, and the protuberance 64 may be symmetrical or asymmetrical about the central axis 38 of the disk 22 with the recess having substantially the same shape. It is contemplated that the most commonly used disk will have a generally dome-shaped protuberance 64, as exemplified in FIG. 3.

Referring to the examples of FIGS. 2, 3, 5, and 6, the pressure support 24 includes an inside edge region 68 extending inwardly from the peripheral flange 46 and generally conforming to the shape of the protuberance 64 when the inside edge region 68 extends inwardly to the protuberance 64. The inside edge region 68 extends the inside edge 48 a selected distance towards the central axis 38 of the disk 22 in order to increase the outlet relief pressure to a selected magnitude and to leave the central portion 50 of the pressure support 24 open, with the axially corresponding portion of the inlet side 34 of the disk 22 unsupported. Referring to the example of FIG. 2, preferably the inside edge 48 of the pressure support 24, as extended by the inside edge region 68, defines a plane about perpendicular to the central axis 38 of the disk 22.

Referring to the example of FIG. 5, in one embodiment the inside edge 48 of the pressure support includes at least one notch or scallop 72 in order to decrease the outlet relief pressure to a selected magnitude. The notch or notches 72 should not be axially aligned with the hinge 42 of the disk 22. Referring to the example of FIG. 8, in another embodiment, the inside edge 48 of the pressure support 24 is flared towards the disk 22 to increase the outlet relief pressure to a selected magnitude. As exemplified in FIG. 9, the inside edge 48 of the pressure support may be flared away from the disk 22 to decrease the outlet relief pressure to a selected magnitude. Referring to the example of FIG. 10, in another embodiment, the protuberance 64 is defined as having a radius of curvature 74 and the inside edge region 68 of the pressure support 24 is defined as having a radius of curvature 76. The radius of curvature 76 of the inside edge region 68 is increased relative to the radius of curvature 74 of the protuberance 64 in order to decrease the outlet relief pressure to a selected magnitude. The radius of curvature 76 of the inside edge region 68 may be selectively decreased relative to the radius of curvature 74 of the protuberance 64 in order to increase the outlet relief pressure to a selected magnitude.

As previously mentioned, in both the planar disk 22 of FIG. 2 and the protuberant disk 22 of FIG. 3, the pressure support 24 may include at least one support member 52 (best seen in FIGS. 6 and 7) extending across the open central portion 50 of the pressure support 24 for supporting the inlet side 34 of the disk 22 against pressure from the outlet side 36 of the disk 22. The support member 52 should generally conform to the shape of the disk 22 and when the disk 22 has a protuberance 64 the support member 52 should normally have about the same radius of curvature as the protuberance 64. The radius of curvature of the support member 52 may be decreased with respect to the radius of curvature of the protuberance 64 in order to increase the outlet relief pressure to a selected magnitude; and may be increased relative to the radius of curvature of the protuberance 64 in order to decrease the outlet relief pressure to a selected magnitude. Further, the support member 52 may substantially close or cover the entire central portion 50 of the pressure support 24 and openings 54 may be provided in the support member to selectively increase and decrease the magnitude of the outlet relief pressure, as previously discussed. Preferably, the support member includes at least one weaker area 56 of selected pressure supporting weakness with respect to the remainder of the support member 52. The weakness of the weaker area 56 is selected to predetermine the magnitude of the outlet relief pressure.

Referring to the example embodiment of FIGS. 1–3, the assembly 20 may also include an intermediate gasket 44, disposed between the peripheral flange 26 of the disk 22 and the peripheral flange 46 of the pressure support 24. The intermediate gasket may further include an inside edge region 82 and an inside edge 84 (FIG. 2) which are co-extensive with and conform to the shape of the inside edge region 68 and inside edge 48 of the pressure support 24. In this configuration, the intermediate gasket 44 fills what would otherwise be a void or partial void between the inside edge region 68 of the pressure support 24 and the inlet side 34 of the disk 22 and prevents residue from building up in the space filled by the intermediate gasket 44. This can be of great importance and advantage when the assembly 20 is used in highly sterile or clean applications such as are necessary in the semi-conductor industry.

Referring to the example embodiment of FIGS. 1–3, the assembly 20 includes inlet gasket means 90 disposed on the inlet side 92 of the pressure support 24 between the pressure support 24 and the inlet clamp 28 for adjusting the outlet relief pressure to a selected magnitude. Referring to the example embodiment of FIG. 1, the preferred inlet gasket means 90 includes a peripheral inlet gasket, also designated 90, having an inside edge 94 defining an open central portion 96 of the inlet gasket 90. The inside edge 94 of the inlet gasket 90 is extended towards the central axis 38 relative to the peripheral flange 26 of the disk 22 in order to reduce the size of the open central portion 50 and to increase the outlet relief pressure to a selected magnitude. The inside edge 94 of the inlet gasket 90 is extended away from the central axis 38 of the disk 22 relative to the peripheral flange 26 of the disk 22 in order to increase the size of the open central portion 50 and to decrease the outlet relief pressure to a selected magnitude. The inside edge 94 of the inlet gasket 90 should at least slightly overlap the inlet side 34 of the disk flange 26. The hardness and/or stiffness of the inlet gasket means 90 may be selectively increased to increase the outlet relief pressure to a selected magnitude. The hardness and/or stiffness of the inlet gasket means 90 may be selectively decreased to decrease the outlet relief pressure to a selected magnitude. The axial thickness of the inlet gasket means 90 may be selectively increased to increase the outlet relief pressure to a selected magnitude. The axial thickness of the inlet gasket means 90 may be selectively decreased to decrease the outlet relief pressure to a selected magnitude.

Referring to the example embodiment of FIG. 11, the inside edge 94 of the inlet gasket 90 may be selectively skewed towards the central axis 38 and the disk 22 in order to increase the outlet relief pressure to a selected magnitude. The inside edge 94 of the inlet gasket 90 may be selectively skewed toward the central axis 38 and the inlet clamp 28 in order to decrease the outlet relief pressure to a selected magnitude, as best seen in FIG. 12. These properties of the skewed inside edge 94 may be accomplished by linearly skewing the inside edge 94 or by skewing the inside edge 94 with a concave or convex radius, as would be known to one skilled in the art in view of the disclosure contained herein.

Referring to the example embodiment of FIGS. 1–3, the assembly 20 may also include outlet gasket means, or peripheral outlet gasket, 100 disposed on the outlet side 36 of the disk 22 between the peripheral flange 26 of the disk 22 and the outlet clamp 30 for adjusting the inlet relief pressure to a selected magnitude. The outlet gasket 100 has an inside edge 102 defining an open central portion 104 of the outlet gasket 100. The inside edge 102 of the outlet gasket 100 may be extended towards the central axis 38 relative to the peripheral flange 26 of the disk 22 in order to reduce the size of the open central portion 104 and to increase the inlet relief pressure to a selected magnitude. The inside edge 102 of the outlet gasket 100 may be extended away from the central axis 38 of the disk 22 relative to the peripheral flange 26 of the disk 22 in order to increase the size of the open central portion 104 and to decrease the inlet relief pressure to a selected magnitude. The inside edge 102 of the outlet gasket 100 should at least slightly overlap the outlet side 36 of the disk flange 26. The hardness or stiffness of the outlet gasket 100 may be selectively increased to increase the inlet relief pressure to a selected magnitude. The hardness or stiffness of the outlet gasket 100 may be selectively decreased to decrease the inlet relief pressure to a selected magnitude. The axial thickness of the outlet gasket 100 may be selectively increased to increase the inlet relief pressure to a selected magnitude. The axial thickness of the outlet gasket 100 may be selectively decreased to decrease the inlet relief pressure to a selected magnitude. The inside edge 102 of the outlet gasket 100 may be selectively skewed towards the central axis 38 and the disk 22 in order to increase the inlet relief pressure to a selected magnitude, as best seen in FIG. 13. The inside edge 102 of the outlet gasket 100 may be selectively skewed towards the central axis 38 and the outlet clamp 30 in order to decrease the inlet relief pressure to a selected magnitude, as best seen in FIG. 14.

Referring to the example embodiment of FIGS. 11–12, the two-way pressure relief assembly 20 of the present invention may be used without the pressure support 24. In such an assembly, the inlet gasket means, or inlet gasket 90 is disposed on the inlet side 34 of the disk 22 between the disk flange 26 and the inlet clamp 28 for adjusting the outlet relief pressure to a selected magnitude. The outlet gasket, or outlet gasket means, 100 may be used with the assembly 20 independently of or in combination with the inlet gasket 90. The magnitudes of the inlet and outlet relief pressures may be selectively adjusted using the inlet and/or outlet gaskets 90, 100 in the same manner as previously described.

As will be known to one skilled in the art in view of the disclosure contained herein, the pressure support 24, disk 22, inlet gasket 90, and outlet gasket 100 may be constructed or adjusted as previously described to selectively predetermine the inlet relief pressure, outlet relief pressure, and ratio of the inlet relief pressure to the outlet relief pressure in a predictable, accurate, and repeatable manner.

Referring to the example of FIGS. 1–3, a method of providing two-way pressure relief in a pressure containment passageway 32 includes sealingly clamping a peripheral flange 26 of the disk 22 between inlet and outlet clamps 28, 30 in the passageway 32; causing the flange 26 and disk 22 to pull out from between the inlet and outlet clamps 28, 30 and move toward the outlet clamp 30 when a selected inlet relief pressure is exerted on the inlet side 34, thereby allowing pressure relief through the assembly 20; causing the flange 26 and disk 22 to pull out from between the inlet and outlet clamps 28, 30 and move towards the inlet clamp 28 when a selected outlet relief pressure is exerted on the outlet side 36 of the disk 22, thereby allowing pressure relief through the assembly 20; and selectively increasing the magnitude of the outlet relief pressure by connecting a pressure support 24 between the peripheral flange 26 of the disk 22 and the inlet clamp 28. The method provides for securing a hinge portion 42 of the disk 22 between the inlet and outlet clamps during and after pressure relief through the assembly 20 in order to retain the disk 22 within the assembly 20, i.e., so the disk 22 is not discharged from the assembly 20 during a pressure relieving event.

The method also provides for connecting an intermediate gasket 44 between the peripheral flange 26 of the disk 22 and the pressure support 24. The method further provides for increasing the outlet relief pressure by clamping a peripheral flange 46 of the pressure support 24 between the inlet side 34 of the peripheral flange 26 of the disk 22 and the inlet clamp 28; and circumscribing an open central portion 50 of the pressure support 24 with an inside edge 48 of the pressure support 24 so that the open central portion 50 of the pressure support provides no direct support to the inlet side 34 of the disk 22. The method provides for selectively extending the inside edge 48 of the pressure support 24 toward the central axis 38 relative to the inlet clamp 28 in order to reduce the size of the open central portion 50 and to increase the outlet relief pressure to a selected magnitude; and selectively extending the inside edge 48 of the pressure support 24 away from the central axis 38 relative to the inlet clamp 28 in order to increase the size of the open central portion 50 and to decrease the outlet relief pressure to a selected magnitude.

Referring to the example of FIGS. 6 and 7, the method provides for extending at least one support member 52 across the central portion 50 of the pressure support 24 in order to support to the inlet side 34 of the disk 22 against pressure from the outlet side 36 of the disk 22. The method provides for selectively weakening at least one weaker area 56 of the support member 52 in order to predetermine the outlet relief pressure. Referring to the example of FIG. 6, the method provides for providing numerous support members 52 in a spoke-like arrangement, or in any other arrangement designed to increase the outlet relief pressure.

Referring to the example of FIG. 7, where the support member 52 covers or closes the entire central portion 50, the method provides for creating at least two (2) openings 54 in the support member 52. Weaker areas 56 may be provided between the openings 54 to adjust the outlet relief pressure to a selected magnitude.

Referring to the example of FIG. 2, the method of the present invention may be adapted to a disk 22 and disk flange 26 which are generally planar. Referring to the example FIG. 3, more preferably, the method provides for extending a protuberance 64 from the inlet side 34 of the disk 22 toward the inlet clamp 28 and providing a recess 66 of substantially the same shape as the protuberance 64 in the outlet side 36 of the disk 22. Referring to the example of FIGS. 2 and 3, the method provides for extending an inside region 68 and the inside edge 48 of the pressure support 24 inwardly from the peripheral flange 46 of the pressure support; generally conforming the inside edge region 68 to the shape of the protuberance 64; and extending the inside edge region 68 towards the central axis 38 of the disk 22 in order to increase the outlet relief pressure to a selected magnitude and to leave the central portion 50 of the pressure support 24 open with the axially corresponding portion of the inlet side 34 of the disk 22 unsupported.

Referring to the example of FIG. 3, in one embodiment the inside edge 68 of the pressure support 24 defines a plane about perpendicular to the central axis 38 of the disk 22. Referring to the example of FIG. 5, the method provides for making at least one notch 72 in the inside edge 68 of the pressure support 24 in order to decrease the outlet relief pressure to a selected magnitude. Referring to the example of FIG. 8, the method provides for flaring the inside edge 48 of the pressure support 24 toward the disk 22 in order to increase the outlet relief pressure to a selected magnitude; and flaring the inside edge 48 of the pressure support 24 away from the disk 22 to decrease the outlet relief pressure to a selected magnitude in FIG. 9.

Referring to the example of FIG. 10, the method provides for providing the protuberance 64 with a radius of curvature 74 and providing the inside edge region 68 of the pressure support 24 with a radius of curvature 76. The method provides for increasing the radius of curvature 76 of the inside edge region 68 relative to the radius of curvature 74 of the protuberance 64 in order to decrease the outlet relief pressure to a selected magnitude. The method provides for decreasing the radius of curvature 76 of the inside edge region 68 of the pressure support 24 relative to the radius of curvature 74 of the protuberance 64 in order to increase the outlet relief pressure to a selected magnitude. Referring to the example of FIGS. 1, 6, and 7, the method provides for using the various forms of the support member 52 previously discussed with a disk 22 having a protuberance 74. Referring to the example of FIGS. 1–3, the method provides for connecting an intermediate gasket 44 between the peripheral flange 26 of the disk 22 and the peripheral flange 46 of the pressure support 24; as well as providing the intermediate gasket 44 with an inside edge region 82 and an inside edge 84 coextensive with and conforming to the shape of the inside edge region 68 and inside edge 48 of the pressure support 24.

Referring to the examples of FIGS. 1–3, the method further provides inlet gasket 90 and outlet gasket 100. The inlet gasket 90, outlet gasket 100, and pressure support 24 may be used independently or in combination with each other, as would be known to one skilled in the art in view of the disclosure contained herein. The method provides for connecting the inlet gasket 90 on the inlet side 92 of the pressure support 24 between the pressure support 24 and the inlet clamp 28 in order to adjust the outlet relief pressure to a selected magnitude. The method provides for circumscribing an open central portion 96 of the inlet gasket 90 with an inside edge 94 of the inlet gasket 90 and selectively extending the inside edge 94 of the inlet gasket 90 towards the central axis 38 relative to the peripheral flange 26 of the disk 22 in order to reduce the size of the open central portion 96 and to increase the outlet relief pressure to a selected magnitude. The method further provides for circumscribing an open central portion 96 of the inlet gasket 90 with an inside edge 94 of the inlet gasket 90 and selectively extending the inside edge 94 of the inlet gasket 90 away from the central axis 38 of the disk 22 relative to the peripheral flange 26 of the disk 22 in order to increase the size of the open central portion 96 and to decrease the outlet relief pressure to a selected magnitude. The method provides for selectively increasing the hardness of the inlet gasket 90 in order to increase the outlet relief pressure to a selected magnitude. The method provides for selectively decreasing the hardness of the inlet gasket 90 in order to decrease the outlet relief pressure to a selected magnitude. The method provides for selectively increasing the axial thickness of the inlet gasket 90 in order to increase the outlet relief pressure to a selected magnitude. The method provides for selectively decreasing the axial thickness of the inlet gasket 90 in order to decrease the outlet relief pressure to a selected magnitude. Referring to FIGS. 11 and 12, the method provides for selectively skewing the inside edge 94 of the inlet gasket 90 toward the central axis 38 and the disk 22 in order to increase the outlet relief pressure to a selected magnitude (FIG. 11). The method provides for selectively skewing the inside edge 94 of the inlet gasket 90 toward the central axis 38 and the inlet clamp 28 in order to decrease the outlet relief pressure to a selected magnitude (FIG. 12).

Referring to the example of FIGS. 1–3, the method further provides for selectively adjusting the magnitude of the inlet relief pressure by connecting an outlet gasket 100 on the outlet side 36 of the disk 22 between the peripheral flange 26 of the disk and the outlet clamp 30. The method provides for circumscribing an open central portion 104 of the outlet gasket 100 with an inside edge 102 of the outlet gasket and selectively extending the inside edge 102 of the outlet gasket 100 toward the central axis 38 relative to the peripheral flange 26 of the disk 22 in order to reduce the size of the open central portion 104 and to increase the inlet relief pressure to a selected magnitude. Referring to FIGS. 13 and 14, the method provides for selectively extending the inside edge 102 of the outlet gasket 100 away from the central axis 38 of the disk 22 relative to the peripheral flange 26 of the disk 22 in order to increase the size of the open central portion 104 of the outlet gasket 100 and to decrease the inlet relief pressure to a selected magnitude. The method provides for selectively increasing the hardness of the outlet gasket in order to increase the inlet relief pressure to a selected magnitude. The method provides for selectively decreasing the hardness of the outlet gasket 100 in order to decrease the inlet relief pressure to a selected magnitude. The method provides for selectively increasing the axial thickness of the outlet gasket 100 in order to increase the inlet relief pressure to a selected magnitude. The method provides for selectively decreasing the axial thickness of the outlet gasket 100 in order to decrease the inlet relief pressure to a selected magnitude. The method provides for selectively skewing the inside edge 102 of the outlet gasket 100 toward the central axis 38 and the disk 22 in order to increase the inlet relief pressure to a selected magnitude. Referring to FIGS. 13 and 14, the method provides for selectively skewing the inside edge 102 of the outlet gasket 100 towards the central axis 38 and the outlet clamp 30 in order to decrease the inlet relief pressure to a selected magnitude.

Referring to the example of FIGS. 1–3, a prototype of the inventive assembly 20 and method will now be described in greater detail to facilitate a better understanding of the invention. In the prototype assembly 20, an inlet bite 112 is formed in the inlet clamp 28. An outlet bite 114 is formed in the outlet clamp 30. The preferred inlet and outlet bites 112, 114 circumscribe and define the flow passageway 32 through the assembly 20. As best exemplified in FIG. 1, the preferred bites 112, 114 are about annular and extend axially toward one another when the inlet and outlet clamps 28, 30 are assembled. The inlet clamp 28 includes an inlet stop 116 circumscribing the inlet bite 112. The outlet clamp 30 includes an outlet stop 118 circumscribing the outlet bite 114. As best seen in FIGS. 2 and 3, when the inlet and outlet clamps 28, 30 are assembled with the disk 22 held between the inlet and outlet bites 112, 114, the inlet and outlet stops 116, 118 are in hard contact, while the inlet and outlet bites 112, 114 have a pre-selected axial distance separating them. The distance between the inlet and outlet bites 112, 114 is selected to provide a desired, constant compression on the disk 22, pressure support 24, and gaskets 44, 90, 100. In the prototype assembly 20, the inlet clamp 28 includes an annular inlet relief cavity 122 between the inlet bite 112 and inlet stop 116. Preferably, the outlet clamp 30 includes an annular outlet relief cavity 124 between the outlet bite 114 and outlet stop 118. The peripheral flange 26 of the disk 22, excepting the hinge portion 42, terminates within the annulus defined by the inlet and outlet bites 112, 114 so that the inlet and outlet bites 112, 114 exert the desired compression on the desired area of the disk flange 26. Preferably, the pressure support 24 and gaskets 44, 90, 100 extend radially outwardly into the inlet and outlet relief cavities 122, 124, as does the hinge portion 42 of the disk 22. Either of the inlet relief cavity 122 or outlet relief cavity 124 may be eliminated.

The inlet and outlet clamps 28, 30 (commonly referred to as "heads") are normally sealingly clamped between pipe flanges or the like in a pressure containment system, as would be known to one skilled in the art in view of the disclosure contained herein. It is intended to be understood that the inlet and outlet bites 112, 114 may be used with the inventive assembly 20 independently of the inlet and outlet stops 116, 118; and the inlet and outlet bites 112, 114 and/or inlet and outlet stops 116, 118 may be integrally formed in a pressure containment structure, flanges, or other piping or pressure vessel components, as would be known to one skilled in the art in view of the disclosure contained herein.

It is also intended to be understood that the terms "inlet" and "outlet" are used throughout this document to simplify the description and facilitate understanding. Since the inventive assembly 20 is a two-way pressure relieving assembly, either side of the disk 22 may be considered the inlet or outlet; and the ultimate orientation of the assembly 20 will depend upon the technical requirements and operating conditions of a specific situation. More specifically, it is contemplated that the assembly 20 will often be used in situations requiring twoway pressure relief at two different relief pressures, i.e., the relief pressure in one direction will be higher than that of the other. If the assembly is used with a domed or reverse buckling disk, normally a higher pressure is required to open the disk from the concave side, and therefore the concave side of the disk would normally be oriented towards the source of higher pressure, regardless of inlet and outlet designations.

The prototype assembly 20, beginning on the inlet side, includes an annular inlet gasket 90, an annular stiffening ring 120, the pressure support 24, an annular intermediate gasket 44, the disk 22, and an annular outlet gasket 100. Depending upon the operating conditions and requirements of the environment in which the assembly 20 will be used, the only components which will be used in every situation are the inlet and outlet clamps 28, 30, disk 22, and either the pressure support 24 or the inlet gasket 90.

As previously mentioned, in the prototype and preferred embodiments, the clamps 28, 30 provide a constant compression on the components of the disk assembly 20 clamped between them. Therefore, the other components are selected and adjusted to provide the desired operating features of the two-way pressure relieving assembly. For example, it is contemplated that where a low pressure ratio between the inlet and outlet relief pressure is desired (a low pressure ratio is typically between 1.0 and 4.0) the pressure relieving assembly will include the inlet gasket 90 and disk 22, and the pressure support 24 may be eliminated. The outlet gasket 100 may be used if necessary to fine tune the inlet relief pressure or to prevent leakage. The outlet relief pressure will be predetermined by adjusting the inside diameter of the inlet gasket 90 and properly selecting the axial thickness and hardness of the inlet gasket 90. The stiffening ring, which typically has a significantly larger inside diameter than the gaskets 90, 100 may be added for handling purposes, i.e., to prevent damage in handling the assembly 20 which may be made of very thin and easily damaged materials at low pressure ratings.

At intermediate pressure ratios (typically between 1.8 and 6.0) it is contemplated that the inlet and outlet gaskets 90, 100 will be used predominantly to prevent leakage, the stiffening ring 120 may be used to prevent damage in handling, and the pressure relieving properties of the assembly will be determined by the pressure support 24 and disk 22. Assuming the disk 22 is a reverse buckling disk, The inlet relief pressure will be predominantly determined by the thickness and radius of curvature 74 of the disk 22. The outlet relief pressure will be determined predominantly by the inside diameter of the pressure support 24 (the size of the open central portion 50), the radius of curvature 76 of the inside edge region 68 of the pressure support 24 (FIG. 10), the placement of notches 72 in the inside edge 48 of the pressure support 24 (FIG. 5), and/or the flaring of the inside edge of the pressure support 24 (FIGS. 8 and 9).

If a high pressure ratio (typically between 3.0 and 25.0) is required, it is contemplated that a full pressure support will be used, i.e., a pressure support having support members 52 extending across the central portion 50. The support members 52 and weaker areas 56 in these support members 52 will be selected to give the desired outlet relief pressure. Normally the radius of curvature and thickness of the disk protuberance 64 will have the most influence on the inlet relief pressure, although this may be fine tuned by adjusting the inside diameters, hardnesses, and thicknesses of the inlet and outlet gaskets 90, 100, as previously discussed. It should be noted that, when a disk 22 having a protuberance 64 is used, decreasing the inside diameter of the outlet gasket smaller than the diameter of the recess 66 has little effect on the relief pressures.

While presently preferred embodiments of the invention have been described herein for the purpose of disclosure, numerous changes in the construction and arrangement of parts and/or the performance of steps will suggest themselves to those skilled in the art in view of the disclosure contained herein, which changes are encompassed within the spirit of this invention as defined by the following claims.

What is claimed is:

1. A two-way pressure relief assembly which may be sealingly clamped between inlet and outlet clamps in a pressure containment passageway, comprising:
    a disk having a peripheral flange extending from the disk for clamping the disk between the inlet and outlet clamps in a passageway, an inlet side, an outlet side, and a central axis extending through the inlet and outlet sides; the inlet side of the disk having a selected inlet relief pressure which, when exerted on the inlet side, will cause the flange and disk to pull out from between the inlet and outlet clamps and move toward the outlet side, thereby allowing pressure relief through the assembly; the outlet side of the disk having an outlet relief pressure which, when exerted on the outlet side, will cause the flange and disk to pull out from between the inlet and outlet clamps and move toward the inlet side, thereby allowing pressure relief through the assembly; and
    a pressure support, disposed on the inlet side of the disk between the peripheral flange and the inlet clamp, for increasing the outlet relief pressure to a selected magnitude; the pressure support comprising:
        a peripheral flange disposed for clamping between the inlet side of the peripheral flange of the disk and the inlet clamp; and
        an inside edge defining an open central portion of the pressure support, the open central portion providing no direct support to the inlet side of the disk; and
    in which the inlet side of the disk comprises:
    a protuberance extending from the central portion of the disk toward the inlet clamp, and the outlet side of the disk comprises:
    a recess of substantially the same shape as the protuberance.

2. Assembly of claim 1 in which the pressure support comprises:
    an inside edge region extending inwardly from the peripheral flange and generally conforming to the shape of the protuberance, the inside edge region extending the inside edge a selected distance toward the central axis of the disk in order to increase the outlet relief pressure to a selected magnitude and to leave the central portion of the pressure support open with the axially coextensive portion of the inlet side of the disk unsupported.

3. Assembly of claim 2:
    wherein the inside edge of the pressure support includes at least one notch in order to decrease the outlet relief pressure to a selected magnitude.

4. Assembly of claim 2:
    wherein the inside edge of the pressure support is flared toward the disk to increase the outlet relief pressure to a selected magnitude.

5. Assembly of claim 2:
    wherein the inside edge of the pressure support is flared away from the disk to decrease the outlet relief pressure to a selected magnitude.

6. Assembly of claim 2:
    wherein the protuberance is defined as having a radius of curvature; and
    wherein the inside edge region of the pressure support is defined as having a radius of curvature; and
    wherein the radius of curvature of the inside edge region is increased relative to the radius of curvature of the protuberance in order to decrease the outlet relief pressure to a selected magnitude.

7. Assembly of claim 2:
    wherein the inlet side of the protuberance is defined as having a radius of curvature; and
    wherein the inside edge region of the pressure support is defined as having a radius of curvature; and
    wherein the radius of curvature of the inside edge region of the pressure support is decreased relative to the radius of curvature of the protuberance in order to increase the outlet relief pressure to a selected magnitude.

8. Assembly of claim 2 in which the pressure support comprises:
    at lease one support member extending across the open central portion of the pressure support, for supporting the inlet side of the disk against pressure from the outlet side of the disk.

9. Assembly of claim 8 in which the support member comprises:
    at least one weaker area of selected pressure supporting weakness with respect to the remainder of the support member, the weakness of the weaker area being selected to predetermine the outlet relief pressure.

10. Assembly of claim 8 in which the support member comprises:
    at least two openings in the support member.

11. Assembly of claim 2, comprising:
    an intermediate gasket disposed between the peripheral flange of the disk and the peripheral flange of the pressure support and having an inside edge region and an inside edge coextensive with and conforming to the shape of the inside edge region and inside edge of the pressure support.

12. A two way pressure relief assembly which may be sealingly clamped between inlet and outlet clamps in a pressure containment passageway, comprising:
    a disk having a peripheral flange extending from the disk for clamping the disk between the inlet and outlet clamps in a passageway, an inlet side, an outlet side, and a central axis extending through the inlet and outlet sides; the inlet side of the disk having a selected inlet relief pressure which, when exerted on the inlet side, will cause the flange and disk to pull out from between the inlet and outlet clamps and move toward the outlet side, thereby allowing pressure relief through the assembly; the outlet side of the disk having an outlet relief pressure which, when exerted on the outlet side, will cause the flange and disk to pull out from between the inlet and outlet clamps and move toward the inlet side, thereby allowing pressure relief through the assembly;

a pressure support, disposed on the inlet side of the disk between the peripheral flange and the inlet clamp, for increasing the outlet relief pressure to a selected magnitude; the pressure support having an inlet side facing away from the disk and an outlet side facing the disk; and inlet gasket means, disposed on the inlet side of the pressure support between the pressure support and the inlet clamp, for adjusting the outlet relief pressure to a selected magnitude, the inlet gasket means comprising:
a peripheral inlet gasket having an inside edge defining an open central portion of the inlet gasket; and
wherein the inside edge of the inlet gasket is selectively extended toward the central axis relative to the peripheral flange of the disk in order to reduce the size of the open central portion and to increase the outlet relief pressure to a selected magnitude.

13. A two-way pressure relief assembly which may be sealingly clamped between inlet and outlet clamps in a pressure containment passageway, comprising:

a disk having a peripheral flange extending from the disk for clamping the disk between the inlet and outlet clamps in a passageway, an inlet side, an outlet side, and a central axis extending through the inlet and outlet sides; the inlet side of the disk having a selected inlet relief pressure which, when exerted on the inlet side, will cause the flange and disk to pull out from between the inlet and outlet clamps and move toward the outlet side, thereby allowing pressure relief through the assembly; the outlet side of the disk having an outlet relief pressure which, when exerted n the outlet side, will cause the flange and disk to pull out from between the inlet and outlet clamps and move toward the inlet side, thereby allowing pressure relief through the assembly;

a pressure support, disposed on the inlet side of the disk between the peripheral flange and the inlet clamp, for increasing the outlet relief pressure to a selected magnitude; the pressure support having an inlet side facing away from the disk and an outlet side facing the disk; and inlet gasket means, disposed on the inlet side of the pressure support between the pressure support and the inlet clamp, for adjusting the outlet relief pressure to a selected magnitude, the inlet gasket means comprising:
a peripheral inlet gasket having an inside edge defining an open central portion of the inlet gasket; and
wherein the inside edge of the inlet gasket is selectively extended away from the central axis relative to the peripheral flange of the disk in order to increase the size of the open central portion and to decrease the outlet relief pressure to a selected magnitude.

14. A two-way pressure relief assembly which may be sealingly clamped between inlet and outlet clamps in a pressure containment passageway, comprising:

a disk having a peripheral flange extending from the disk for clamping the disk between the inlet and outlet clamps in a passageway, an inlet side, an outlet side, and a central axis extending through the inlet and outlet sides; the inlet side of the disk having a selected inlet relief pressure which, when exerted on the inlet side, will cause the flange and disk to pull out from between the inlet and outlet clamps and move toward the outlet side, thereby allowing pressure relief through the assembly; the outlet side of the disk having an outlet relief pressure which, when exerted on the outlet side, will cause the flange and disk to pull out from between the inlet and outlet clamps and move toward the inlet side, thereby allowing pressure relief through the assembly;

a pressure support, disposed on the inlet side of the disk between the peripheral flange and the inlet clamp, for increasing the outlet relief pressure to a selected magnitude; the pressure support having an inlet side facing away from the disk and an outlet side facing the disk; and inlet gasket means, disposed on the inlet side of the pressure support between the pressure support and the inlet clamp, for adjusting the outlet relief pressure to a selected magnitude, the inlet gasket means comprising:
a peripheral inlet gasket having an inside edge defining an open central portion of the inlet gasket; and
wherein the inside edge is selectively skewed toward the central axis and the disk in order to increase the outlet relief pressure to a selected magnitude.

15. A two-way pressure relief assembly which may be sealingly clamped between inlet and outlet clamps in a pressure containment passageway, comprising:

a disk having a peripheral flange extending from the disk for clamping the disk between the inlet and outlet clamps in a passageway, an inlet side, an outlet side, and a central axis extending through the inlet and outlet sides; the inlet side of the disk having a selected inlet relief pressure which, when exerted on the inlet side, will cause the flange and disk to pull out from between the inlet and outlet clamps and move toward the outlet side, thereby allowing pressure relief through the assembly; the outlet side of the disk having an outlet relief pressure which, when exerted on the outlet side, will cause the flange and disk to pull out from between the inlet and outlet clamps and move toward the inlet side, thereby allowing pressure relief through the assembly;

a pressure support, disposed on the inlet side of the disk between the peripheral flange and the inlet clamp, for increasing the outlet relief pressure to a selected magnitude; the pressure support having an inlet side facing away from the disk and an outlet side facing the disk; and inlet gasket means, disposed on the inlet side of the pressure support between the pressure support and the inlet clamp, for adjusting the outlet relief pressure to a selected magnitude, the inlet gasket means comprising:
a peripheral inlet gasket having an inside edge defining an open central portion of the inlet gasket; and
wherein the inside edge is selectively skewed toward the central axis and the inlet clamp in order to decrease the outlet relief pressure to a selected magnitude.

16. A two-way pressure relief assembly which may be sealingly clamped between inlet and outlet clamps in a pressure containment passageway, comprising:

a disk having a peripheral flange extending from the disk for clamping the disk between the inlet and outlet clamps in a passageway, an inlet side, an outlet side, and a central axis extending through the inlet and outlet sides; the inlet side of the disk having a selected inlet relief pressure which, when exerted on the inlet side, will cause the flange and disk to pull out from between the inlet and outlet clamps and move toward the outlet side, thereby allowing pressure relief through the assembly; the outlet side of the disk having an outlet relief pressure which, when exerted on the outlet side, will cause the flange and disk to pull out from between the inlet and outlet clamps and move toward the inlet side, thereby allowing pressure relief through the assembly;

a pressure support, disposed on the inlet side of the disk between the peripheral flange and the inlet clamp, for increasing the outlet relief pressure to a selected magnitude; and outlet gasket means, disposed on the outlet side of the disk between the peripheral flange of the disk and the outlet clamp, for adjusting the inlet relief pressure to a selected magnitude.

17. Assembly of claim 16 in which the outlet gasket means comprises:

a peripheral outlet gasket having an inside edge defining an open central portion of the outlet gasket; and wherein the inside edge of the outlet gasket is selectively extended toward the central axis relative to the peripheral flange of the disk in order to reduce the size of the open central portion and to increase the inlet relief pressure to a selected magnitude.

18. Assembly of claim 16 in which the outlet gasket means comprises:

a peripheral outlet gasket having an inside edge defining an open central portion of the outlet gasket; and wherein the inside edge of the outlet gasket is selectively extended away from the central axis of the disk relative to the peripheral flange of the disk in order to increase the size of the open central portion and to decrease the inlet relief pressure to a selected magnitude.

19. Assembly of claim 16:

wherein the hardness of the outlet gasket means is selectively increased to increase the inlet relief pressure to a selected magnitude.

20. Assembly of claim 16:

wherein the hardness of the outlet gasket means is selectively decreased to decrease the inlet relief pressure to a selected magnitude.

21. Assembly of claim 16:

wherein the axial thickness of the outlet gasket means is selectively increased to increase the inlet relief pressure to a selected magnitude.

22. Assembly of claim 16:

wherein the axial thickness of the outlet gasket means is selectively decreased to decrease the inlet relief pressure to a selected magnitude.

23. Assembly of claim 16 in which the outlet gasket means comprises:

a peripheral outlet gasket having an inside edge defining an open central portion of the outlet gasket; and wherein the inside edge is selectively skewed toward the central axis and the disk in order to increase the inlet relief pressure.

24. Assembly of claim 16 in which the outlet gasket means comprises:

a peripheral outlet gasket having an inside edge defining an open central portion of the outlet gasket; and wherein the inside edge is selectively skewed toward the central axis and the outlet clamp in order to decrease the inlet relief pressure to a selected magnitude.

25. A two way pressure relief assembly which may be sealingly clamped between inlet and outlet clamps in a pressure containment passageway, comprising:

a disk having a peripheral flange extending from the disk for clamping the rupture disk between the inlet and outlet clamps in a passageway, an inlet side, an outlet side, and a central axis extending through the inlet and outlet sides; the inlet side of the disk having a selected inlet relief pressure which, when exerted on the inlet side, will cause the flange and disk to pull out of the inlet and outlet clamps and move toward the outlet side, thereby allowing pressure relief through the assembly; the outlet side of the disk having an outlet relief pressure which, when exerted on the outlet side, will cause the flange and disk to pull out of the inlet and outlet clamps and move toward the inlet side, thereby allowing pressure relief through the assembly; and inlet gasket means, disposed on the inlet side of the disk between the disk flange and the inlet clamp, for adjusting the outlet relief pressure to a selected magnitude, comprising:

a peripheral inlet gasket having an inside edge defining an open central portion of the inlet gasket; and wherein the inside edge of the inlet gasket is selectively extended toward the central axis relative to the peripheral flange of the disk in order to reduce the size of the open central portion and to increase the outlet relief pressure to a selected magnitude.

26. A two-way pressure relief assembly which may be sealingly clamped between inlet and outlet clamps in a pressure containment passageway, comprising:

a disk having a peripheral flange extending from the disk for clamping the rupture disk between the inlet and the outlet clamps in a passageway, an inlet side, an outlet side, and a central axis extending through the inlet and outlet sides; the inlet side of the disk having a selected inlet relief pressure which, when exerted on the inlet side, will cause the flange and disk to pull out of the inlet and outlet clamps and move toward the outlet side, thereby allowing pressure relief through the assembly; the outlet side of the disk having an outlet relief pressure which, when exerted on the outlet side, will cause the flange and disk to pull out of the inlet and outlet clamps and move toward the inlet side, thereby allowing pressure relief through the assembly; and inlet gasket means, disposed on the inlet side of the disk between the disk flange and the inlet clamp, for adjusting the outlet relief pressure to a selected magnitude, comprising:

a peripheral inlet gasket having an inside edge defining an open central portion of the inlet gasket; and wherein the inside edge of the inlet gasket is selectively extended away from the central axis of the disk relative to the peripheral flange of the disk in order to increase the size of the open central portion and to decrease the outlet relief pressure to a selected magnitude.

27. A two-way pressure relief assembly which may be sealingly clamped between inlet and outlet clamps in a pressure containment passageway, comprising:

a disk having a peripheral flange extending from the disk for clamping the rupture disk between the inlet and outlet clamps in a passageway, an inlet side, an outlet side, and a central axis extending through the inlet and outlet sides; the inlet side of the disk having a selected inlet relief pressure which, when exerted on the inlet side, will cause the flange and disk to pull out of the inlet and outlet clamps and move toward the outlet side, thereby allowing pressure relief through the assembly; the outlet side of the disk having an outlet relief pressure which, when exerted on the outlet side, will cause the flange and disk to pull out of the inlet and outlet clamps and move toward the inlet side, thereby allowing pressure relief through the assembly; and inlet gasket means, disposed on the inlet side of the disk between the disk flange and the inlet clamp, for adjusting the outlet relief pressure to a selected magnitude; comprising:

a peripheral inlet gasket having an inside edge defining an open central portion of the inlet gasket; and wherein the inside edge is selectively skewed toward the central axis and the disk in order to increase the outlet relief pressure to a selected magnitude.

28. A two-way pressure relief assembly which may be sealingly clamped between inlet and outlet clamps in a pressure containment passageway, comprising:

a disk having a peripheral flange extending from the disk for clamping the rupture disk between the inlet and outlet clamps in a passageway, an inlet side, an outlet side, and a central axis extending through the inlet and outlet sides; the inlet side of the disk having a selected inlet relief pressure which, when exerted on the inlet side, will cause the flange and disk to pull out of the inlet and outlet clamps and move toward the outlet side, thereby allowing pressure relief through the assembly; the outlet side of the disk having an outlet relief pressure which, when exerted on the outlet side, will cause the flange and disk to pull out of the inlet and outlet clamps and move toward the inlet side, thereby allowing pressure relief through the assembly; and inlet gasket means, disposed on the inlet side of the disk between the disk flange and the inlet clamp, for adjusting the outlet relief pressure to a selected magnitude; comprising:

a peripheral inlet gasket having an inside edge defining an open central portion of the inlet gasket; and wherein the inside edge is selectively skewed toward the central axis and the inlet clamp in order to decrease the outlet relief pressure to a selected magnitude.

29. A two-way pressure relief assembly which may be sealingly clamped between inlet and outlet clamps in a pressure containment passageway, comprising:

a disk having a peripheral flange extending from the disk for clamping the rupture disk between the inlet and outlet clamps in a passageway, an inlet side, an outlet side, and a central axis extending through the inlet and outlet sides; the inlet side of the disk having a selected inlet relief pressure which, when exerted on the inlet side, will cause the flange and disk to pull out of the inlet and outlet clamps and move toward the outlet side, thereby allowing pressure relief through the assembly; the outlet side of the disk having an outlet relief pressure which, when exerted on the outlet side, will cause the flange and disk to pull out of the inlet and outlet clamps and move toward the inlet side, thereby allowing pressure relief through the assembly;

inlet gasket means, disposed on the inlet side of the disk between the disk flange and the inlet clamp, for adjusting the outlet relief pressure to a selected magnitude; and outlet gasket means, disposed on the outlet side of the disk between the disk flange and the outlet clamp, for adjusting the inlet relief pressure to a selected magnitude.

30. Assembly of claim 29 in which the outlet gasket means comprises:

a peripheral outlet gasket having an inside edge defining an open central portion of the outlet gasket; and wherein the inside edge of the outlet gasket is selectively extended toward the central axis relative to the peripheral flange of the disk in order to reduce the size of the open central portion and to increase the inlet relief pressure to a selected magnitude.

31. Assembly of claim 29 in which the outlet gasket means comprises:

a peripheral outlet gasket having an inside edge defining an open central portion of the outlet gasket; and wherein the inside edge of the outlet gasket is selectively extended away from the central axis of the disk relative to the peripheral flange of the disk in order to increase the size of the open central portion and to decrease the inlet relief pressure to a selected magnitude.

32. Assembly of claim 29:

wherein the hardness of the outlet gasket means is selectively increased to increase the inlet relief pressure to a selected magnitude.

33. Assembly of claim 29:

wherein the hardness of the outlet gasket means is selectively decreased to decrease the inlet relief pressure to a selected magnitude.

34. Assembly of claim 29:

wherein the axial thickness of the outlet gasket means is selectively increased to increase the inlet relief pressure to a selected magnitude.

35. Assembly of claim 29:

wherein the axial thickness of the outlet gasket means is selectively decreased to decrease the inlet relief pressure to a selected magnitude.

36. Assembly of claim 29 in which the outlet gasket means comprises:

a peripheral outlet gasket having an inside edge defining an open central portion of the outlet gasket; and wherein the inside edge is selectively skewed toward the central axis and the disk in order to increase the inlet relief pressure to a selected magnitude.

37. Assembly of claim 29 in which the outlet gasket means comprises:

a peripheral outlet gasket having an inside edge defining an open central portion of the outlet gasket; and wherein the inside edge is selectively skewed toward the central axis and the outlet clamp in order to decrease the inlet relief pressure to a selected magnitude.

38. A two-way pressure relief assembly which may be sealingly clamped between inlet and outlet clamps in a pressure containment passageway, comprising:

a disk having a peripheral flange extending from the disk for clamping the rupture disk between the inlet and outlet clamps in a passageway, an inlet side, an outlet side, and a central axis extending through the inlet and outlet sides; the inlet side of the disk having a selected inlet relief pressure which, when exerted on the inlet side, will cause the flange and disk to pull out of the inlet and outlet clamps and move toward the outlet side, thereby allowing pressure relief through the assembly; the outlet side of the disk having an outlet relief pressure which, when exerted on the outlet side, will cause the flange and disk to pull out of the inlet and outlet clamps and move toward the inlet side, thereby allowing pressure relief through the assembly;

inlet gasket means, disposed on the inlet side of the disk between the disk flange and the inlet clamp, for selectively adjusting the magnitude of the outlet relief pressure; and outlet gasket means, disposed on the outlet side of the disk between the disk flange and the outlet clamp, for selectively adjusting the magnitude of the inlet relief pressure.

39. Method of providing two-way pressure relief in a pressure containment passageway, comprising:

sealingly clamping a peripheral flange of a disk between inlet and outlet clamps in the passageway, the disk having an inlet side, an outlet side, and a central axis extending through the inlet and outlet sides;

causing the flange and disk to pull out from between the inlet and outlet clamps and move toward the outlet side when a selected inlet relief pressure is exerted on the inlet side, thereby allowing pressure relief through the assembly;

causing the flange and disk to pull out from between the inlet and outlet clamps and move toward the inlet side when a selected outlet relief pressure is exerted on the outlet side of the disk, thereby allowing pressure relief through the assembly;

selectively increasing the magnitude of the outlet relief pressure by connecting a pressure support between the peripheral flange of the disk and the inlet clamp, comprising the steps of:

clamping a peripheral flange of the pressure support between the inlet side of the peripheral flange of the disk and the inlet clamp; and circumscribing an open central portion of the pressure support with an inside edge of the pressure support so that the open central portion of the pressure support provides no direct support to the inlet side of the disk;

extending a protuberance from the inlet side of the disk toward the inlet clamp; and providing a recess of substantially the same shape as the protuberance in the outlet side of the disk.

40. Method of claim 39 comprising:

extending an inside edge region and the inside edge of the pressure support inwardly from the peripheral flange of the pressure support;

generally conforming the inside edge region to the shape of the protuberance; and extending the inside edge region a selected distance toward the central axis of the disk in order to increase the outlet relief pressure to a selected magnitude and to leave the central portion of the pressure support open with the axially corresponding portion of the inlet side of the disk unsupported.

41. Method of claim 40 comprising:

making at least one notch in the inside edge of the pressure support in order to decrease the outlet relief pressure to a selected magnitude.

42. Method of claim 40 comprising:

flaring the inside edge of the pressure support toward the disk in order to increase the outlet relief pressure to a selected magnitude.

43. Method of claim 40 comprising:

flaring the inside edge of the pressure support away from the disk to decrease the outlet relief pressure to a selected magnitude.

44. Method of claim 40 comprising:

providing the protuberance with a radius of curvature;

providing the inside edge region of the pressure support with a radius of curvature; and increasing the radius of curvature of the inside edge region relative to the radius of curvature of the protuberance in order to decrease the outlet relief pressure to a selected magnitude.

45. Method of claim 40 comprising:

providing the inlet side of the protuberance with a radius of curvature;

providing the inside edge region of the pressure support with a radius of curvature; and decreasing the radius of curvature of the inside edge region of the pressure support relative to the radius of curvature of the protuberance in order to increase the outlet relief pressure to a selected magnitude.

46. Method of claim 40 comprising:

extending at least one support member across the open central portion of the pressure support in order to support the inlet side of the disk against pressure from the outlet side of the disk.

47. Method of claim 46 comprising:

selectively weakening at least one area of the support member in order to reduce the outlet relief pressure to a selected magnitude.

48. Method of claim 46 comprising:

creating at least two openings in the support member.

49. Method of claim 40 comprising:

connecting an intermediate gasket between the peripheral flange of the disk and the peripheral flange of the pressure support; and providing the intermediate gasket with an inside edge region and an inside edge coextensive with and conforming to the shape of the inside edge region and inside edge of the pressure support.

50. Method of providing two-way pressure relief in a pressure containment passageway, comprising:

sealingly clamping a peripheral flange of a disk between inlet and outlet clamps in the passageway, the disk having an inlet side, an outlet side, and a central axis extending through the inlet and outlet sides;

causing the flange and disk to pull out from between the inlet and outlet clamps and move toward the outlet side when a selected inlet relief pressure is exerted on the inlet side, thereby allowing pressure relief through the assembly;

causing the flange and disk to pull out from between the inlet and outlet clamps and move toward the inlet side when a selected outlet relief pressure is exerted on the outlet side of the disk, thereby allowing pressure relief through the assembly;

selectively increasing the magnitude of the outlet relief pressure by connecting a pressure support between the peripheral flange of the disk and the inlet clamp, the pressure support having an inlet side facing away from the disk and an outlet side facing the disk;

selectively adjusting the magnitude of the outlet relief pressure with an inlet gasket disposed on the inlet side of the pressure support between the pressure support and the inlet clamp;

circumscribing an open central portion of the inlet gasket with an inside edge of the inlet gasket; and selectively extending the inside edge of the inlet gasket toward the central axis relative to the peripheral flange of the disk in order to reduce the size of the open central portion and to increase the outlet relief pressure to a selected magnitude.

51. Method of providing two-way pressure relief in a pressure containment passageway, comprising:

sealingly clamping a peripheral flange of a disk between inlet and outlet clamps in the passageway, the disk having an inlet side, an outlet side, and a central axis extending through the inlet and outlet sides;

causing the flange and disk to pull out from between the inlet and outlet clamps and move toward the outlet side when a selected inlet relief pressure is exerted on the inlet side, thereby allowing pressure relief through the assembly;

causing the flange and disk to pull out from between the inlet and outlet clamps and move toward the inlet side when a selected outlet relief pressure is exerted on the outlet side of the disk, thereby allowing pressure relief through the assembly;

selectively increasing the magnitude of the outlet relief pressure by connecting a pressure support between the peripheral flange of the disk and the inlet clamp, the pressure support having an inlet side facing away from the disk and an outlet side facing the disk;

selectively adjusting the magnitude of the outlet relief pressure with an inlet gasket disposed on the inlet side of the pressure support between the pressure support and the inlet clamp; circumscribing an open central portion of the inlet gasket with an inside edge of the inlet gasket; and selectively extending the inside edge of the inlet gasket away from the central axis relative to the peripheral flange of the disk in order to increase the size of the open central portion and to decrease the outlet relief pressure to a selected magnitude.

52. Method of providing two-way pressure relief in a pressure containment passageway, comprising:

sealingly clamping a peripheral flange of a disk between inlet and outlet clamps in the passageway, the disk having an inlet side, an outlet side, and a central axis extending through the inlet and outlet sides;

causing the flange and disk to pull out from between the inlet and outlet clamps and move toward the outlet side when a selected inlet relief pressure is exerted on the inlet side, thereby allowing pressure relief through the assembly;

causing the flange and disk to pull out from between the inlet and outlet clamps and move toward the inlet side when a selected outlet relief pressure is exerted on the outlet side of the disk;

selectively increasing the magnitude of the outlet relief pressure by connecting a pressure support between the peripheral flange of the disk and the inlet clamp, the pressure support having an inlet side facing away from the disk and an outlet side facing the disk;

selectively adjusting the magnitude of the outlet relief pressure with an inlet gasket disposed on the inlet side of the pressure support between the pressure support and the inlet clamp;

circumscribing an open central portion of the inlet gasket with an inside edge of the inlet gasket; and selectively skewing the inside edge toward the central axis and the disk in order to increase the outlet relief pressure to a selected magnitude.

53. Method of providing two-way pressure relief in a pressure containment passageway, comprising:

sealingly clamping a peripheral flange of a disk between inlet and outlet clamps in the passageway, the disk having an inlet side, an outlet side, and a central axis extending through the inlet and outlet sides;

causing the flange and disk to pull out from between the inlet and outlet clamps and move toward the outlet side when a selected inlet relief pressure is exerted on the inlet side, thereby allowing pressure relief through the assembly;

causing the flange and disk to pull out from between the inlet and outlet clamps and move toward the inlet side when a selected outlet relief pressure is exerted on the outlet side of the disk;

selectively increasing the magnitude of the outlet relief pressure by connecting a pressure support between the peripheral flange of the disk and the inlet clamp, the pressure support having an inlet side facing away from the disk and an outlet side facing the disk;

selectively adjusting the magnitude of the outlet relief pressure with an inlet gasket disposed on the inlet side of the pressure support between the pressure support and the inlet clamp;

circumscribing an open central portion of the inlet gasket with an inside edge of the inlet gasket; and selectively skewing the inside edge toward the central axis and the inlet clamp in order to decrease the outlet relief pressure to a selected magnitude.

54. Method of providing two-way pressure relief in a pressure containment passageway, comprising:

sealingly clamping a peripheral flange of a disk between inlet and outlet clamps in the passageway, the disk having an inlet side, an outlet side, and a central axis extending through the inlet and outlet sides;

causing the flange and disk to pull out from between the inlet and outlet clamps and move toward the outlet side when a selected inlet relief pressure is exerted on the inlet side, thereby allowing pressure relief through the assembly;

causing the flange and disk to pull out from between the inlet and outlet clamps and move toward the inlet side when a selected outlet relief pressure is exerted on the outlet side of the disk, thereby allowing pressure relief through the assembly;

selectively increasing the magnitude of the outlet relief pressure by connecting a pressure support between the peripheral flange of the disk and the inlet clamp; and selectively adjusting the magnitude of the inlet relief pressure with an outlet gasket disposed on the outlet side of the disk between the peripheral flange of the disk and the outlet clamp.

55. Method of claim 54 comprising:

circumscribing an open central portion of the outlet gasket with an inside edge of the outlet gasket; and selectively extending the inside edge of the outlet gasket toward the central axis relative to the peripheral flange of the disk in order to reduce the size of the open central portion and to increase the inlet relief pressure to a selected magnitude.

56. Method of claim 54 comprising:

circumscribing an open central portion of the outlet gasket with an inside edge of the outlet gasket; and selectively extending the inside edge of the outlet gasket away from the central axis of the disk relative to the peripheral flange of the disk in order to increase the size of the central portion and to decrease the inlet relief pressure to a selected magnitude.

57. Method of claim 54 comprising:
selectively increasing the hardness of the outlet gasket in order to increase the inlet relief pressure to a selected magnitude.

58. Method of claim 54 comprising:
selectively decreasing the hardness of the outlet gasket in order to decrease the inlet relief pressure to a selected magnitude.

59. Method of claim 54 comprising:
selectively increasing the axial thickness of the outlet gasket in order to increase the inlet relief pressure to a selected magnitude.

60. Method of claim 54 comprising:
selectively decreasing the axial thickness of the outlet gasket in order to decrease the inlet relief pressure to a selected magnitude.

61. Method of claim 54 comprising:
circumscribing an open central portion of the outlet gasket with an inside edge of the outlet gasket; and
selectively skewing the inside edge toward the central axis and the disk in order to increase the inlet relief pressure to a selected magnitude.

62. Method of claim 54 comprising:
circumscribing an open central portion of the outlet gasket with an inside edge of the outlet gasket; and
selectively skewing the inside edge toward the central axis and the outlet clamp in order to decrease the inlet relief pressure to a selected magnitude.

63. Method of providing two-way pressure relief in a pressure containment passageway, comprising:
sealingly clamping a peripheral flange of a disk between inlet and outlet clamps in the passageway, the disk having an inlet side, an outlet side, and a central axis extending through the inlet and outlet sides;
causing the flange and disk to pull out of the inlet and outlet clamps and move toward the outlet side when a selected inlet relief pressure is exerted on the inlet side of the disk, thereby allowing pressure relief through the assembly;
causing the flange and disk to pull out of the inlet and outlet clamps and move toward the inlet side when a selected outlet relief pressure is exerted on the outlet side, thereby allowing pressure relief through the assembly;
selectively adjusting the magnitude of the outlet relief pressure with an inlet gasket disposed on the inlet side of the disk between the disk flange and the inlet clamp;
circumscribing an open central portion of the inlet gasket with an inside edge of the inlet gasket; and
selectively extending the inside edge of the inlet gasket toward the central axis relative to the peripheral flange of the disk in order to reduce the size of the open central portion and to increase the outlet relief pressure to a selected magnitude.

64. Method of providing two-way pressure relief in a pressure containment passageway, comprising:
sealingly clamping a peripheral flange of a disk between inlet and outlet clamps in the passageway, the disk having an inlet side, an outlet side, and a central axis extending through the inlet and outlet sides;
causing the flange and disk to pull out of the inlet and outlet clamps and move toward the outlet side when a selected inlet relief pressure is exerted on the inlet side of the disk, thereby allowing pressure relief through the assembly;
causing the flange and disk to pull out of the inlet and outlet clamps and move toward the inlet side when a selected outlet relief pressure is exerted on the outlet side, thereby allowing pressure relief through the assembly;
selectively adjusting the magnitude of the outlet relief pressure with an inlet gasket disposed on the inlet side of the disk between the disk flange and the inlet clamp;
circumscribing an open central portion of the inlet gasket with an inside edge of the inlet gasket; and
selectively extending the inside edge of the inlet gasket away from the central axis of the disk relative to the peripheral flange of the disk in order to increase the size of the open central portion and to decrease the outlet relief pressure to a selected magnitude.

65. Method of providing two-way pressure relief in a pressure containment passageway, comprising:
sealingly clamping a peripheral flange of a disk between inlet and outlet clamps in the passageway, the disk having an inlet side, an outlet side, and a central axis extending through the inlet and outlet sides;
causing the flange and disk to pull out of the inlet and outlet clamps and move toward the outlet side when a selected inlet relief pressure is exerted on the inlet side of the disk thereby allowing pressure relief through the assembly;
causing the flange and disk to pull out of the inlet and outlet clamps and move toward the inlet side when a selected outlet relief pressure is exerted on the outlet side, thereby allowing pressure relief through the assembly;
selectively adjusting the magnitude of the outlet relief pressure with an inlet gasket disposed on the inlet side of the disk between the disk flange and the inlet clamp;
circumscribing an open central portion of the inlet gasket with an inside edge of the inlet gasket; and
selectively skewing the inside edge toward the central axis and the disk in order to increase the outlet relief pressure to a selected magnitude.

66. Method of providing two-way pressure relief in a pressure containment passageway, comprising:
sealingly clamping a peripheral flange of a disk between inlet and outlet clamps in the passageway, the disk having an inlet side, an outlet side, and a central axis extending through the inlet and outlet sides;
causing the flange and disk to pull out of the inlet and outlet clamps and move toward the outlet side when a selected inlet relief pressure is exerted on the inlet side of the disk, thereby allowing pressure relief through the assembly;
causing the flange and disk to pull out of the inlet and outlet clamps and move toward the inlet side when a selected outlet relief pressure is exerted on the outlet side, thereby allowing pressure relief through the assembly;
selectively adjusting the magnitude of the outlet relief pressure with an inlet gasket disposed on the inlet side of the disk between the disk flange and the inlet clamp;
circumscribing an open central portion of the inlet gasket with an inside edge of the inlet gasket; and selectively skewing the inside edge toward the central axis and the inlet clamp in order to decrease the outlet relief pressure to a selected magnitude.

67. Method of providing a two-way pressure relief in a pressure containment passageway, comprising:

sealingly clamping a peripheral flange of a disk between inlet and outlet clamps in the passageway, the disk having an inlet side, an outlet side, and a central axis extending through the inlet and outlet sides;

causing the flange and disk to pull out of the inlet and outlet clamps and move toward the outlet side when a selected inlet relief pressure is exerted on the inlet side of the disk, thereby allowing pressure relief through the assembly;

causing the flange and disk to pull out of the inlet and outlet clamps and move toward the inlet side when a selected outlet relief pressure is exerted on the outlet side, thereby allowing pressure relief through the assembly;

selectively adjusting the magnitude of the outlet relief pressure with an inlet gasket disposed on the inlet side of the disk between the disk flange and the inlet clamp;

selectively adjusting the magnitude of the inlet relief pressure with an outlet gasket disposed on the outlet side of the disk between the disk flange and the outlet clamp.

68. Method of claim 67 comprising:

circumscribing an open central portion of the outlet gasket with an inside edge of the outlet gasket; and selectively extending the inside edge of the outlet gasket toward the central axis relative to the peripheral flange of the disk in order to reduce the size of the open central portion and to increase the inlet relief pressure to a selected magnitude.

69. Method of claim 67 comprising:

circumscribing an open central portion of the outlet gasket with an inside edge of the outlet gasket; and selectively extending the inside edge of the outlet gasket away from the central axis of the disk relative to the peripheral flange of the disk in order to increase the size of the open central portion and to decrease the inlet relief pressure to a selected magnitude.

70. Method of claim 67 comprising:

selectively increasing the hardness of the outlet gasket in order to increase the inlet relief pressure to a selected magnitude.

71. Method of claim 67 comprising:

selectively decreasing the hardness of the outlet gasket in order to decrease the inlet relief pressure to a selected magnitude.

72. Method of claim 67 comprising:

selectively increasing the axial thickness of the outlet gasket in order to increase the inlet relief pressure to a selected magnitude.

73. Method of claim 67 comprising:

selectively decreasing the axial thickness of the outlet gasket in order to decrease the inlet relief pressure to a selected magnitude.

74. Method of claim 67 comprising:

circumscribing an open central portion of the outlet gasket with an inside edge of the outlet gasket; and selectively skewing the inside edge of the outlet gasket toward the central axis and the disk in order to increase the inlet relief pressure to a selected magnitude.

75. Method of claim 67 comprising:

circumscribing an open central portion of the outlet gasket with an inside edge of the outlet gasket; and selectively skewing the inside edge of the outlet gasket toward the central axis and the outlet clamp in order to decrease the inlet relief pressure to a selected magnitude.

76. Method of providing two-way pressure relief in a pressure containment passageway comprising:

sealingly clamping a peripheral flange of a disk between inlet and outlet clamps in the passageway, the disk having an inlet side, an outlet side, and an central axis extending through the inlet and outlet side;

causing the flange and disk to pull out of the inlet and outlet clamps and move toward the outlet side when a selected inlet relief pressure is exerted on the inlet side of the disk, thereby allowing pressure relief through the assembly;

causing the flange and disk to pull out of the inlet and outlet clamps and move toward the inlet side when a selected outlet relief pressure is exerted on the outlet side, thereby allowing pressure relief through the assembly;

selectively adjusting the magnitude of the outlet relief pressure with an inlet gasket disposed on the inlet side of the disk between the disk flange and the inlet clamp; and selectively adjusting the magnitude of the inlet relief pressure with an outlet gasket disposed on the outlet side of the disk between the disk flange and the outlet clamp.

* * * * *